US008320679B2

(12) United States Patent
Li et al.

(10) Patent No.: US 8,320,679 B2
(45) Date of Patent: Nov. 27, 2012

(54) METHOD FOR DETECTING OBJECTS USING FLEXIBLE EDGE ARRANGEMENTS

(75) Inventors: Yan Li, Pittsburgh, PA (US); Yanghai Tsin, Plainsboro, NJ (US); Yakup Genc, Dayton, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 1227 days.

(21) Appl. No.: 12/052,864

(22) Filed: Mar. 21, 2008

(65) Prior Publication Data

US 2008/0260261 A1    Oct. 23, 2008

Related U.S. Application Data

(60) Provisional application No. 60/913,303, filed on Apr. 23, 2007.

(51) Int. Cl.
*G06K 9/62* (2006.01)
(52) U.S. Cl. .......... 382/209; 382/152; 382/154; 382/190
(58) Field of Classification Search .................. 382/232, 382/199, 190, 154, 152, 209, 216, 33, 34
See application file for complete search history.

(56) References Cited

U.S. PATENT DOCUMENTS

| 5,321,772 | A | 6/1994 | Sawyer | |
|---|---|---|---|---|
| 6,766,056 | B1 * | 7/2004 | Huang et al. | 382/190 |
| 6,826,316 | B2 * | 11/2004 | Luo et al. | 382/305 |
| 7,035,452 | B2 * | 4/2006 | Akiyoshi et al. | 382/154 |
| 7,085,419 | B2 * | 8/2006 | Akiyoshi et al. | 382/232 |
| 7,227,996 | B2 * | 6/2007 | Imagawa et al. | 382/199 |
| 7,580,560 | B2 * | 8/2009 | Bryll | 382/152 |
| 7,636,478 | B2 * | 12/2009 | Bryll | 382/209 |
| 2004/0234135 | A1 * | 11/2004 | Nomizu | 382/209 |
| 2007/0014467 | A1 * | 1/2007 | Bryll | 382/152 |
| 2008/0025616 | A1 * | 1/2008 | Bryll | 382/209 |
| 2009/0052786 | A1 * | 2/2009 | Gross et al. | 382/209 |

OTHER PUBLICATIONS

Yan Li, Yanghia Tsin, Yakup Genc, and Takeo Kanade, "Object Detection Using 2D Spatial Consraints" publised in IEEE International Conference on Computer Vision and Pattern Recognition (CVPR 2005).

* cited by examiner

*Primary Examiner* — Vu Le
*Assistant Examiner* — Aklilu Woldemariam
(74) *Attorney, Agent, or Firm* — Donald B. Paschburg

(57) ABSTRACT

A method wherein images of different types of objects within a class are partitioned into region stacks. For each one of the stacks, the method: (a) applies a template to extract fragments having a predetermined size and one of a plurality of different spatial orientations, to generate extracted templates; (b) determines, from the extracted templates, a most frequent one thereof having only a first number of fragments with a common spatial orientations; (c) records the number of images having the determined most frequent extracted template; (d) repeats (b) and (c) with successively increasing number of fragments until the number of recoded images falls below a threshold; and (e) selects as a master extracted template the one of the most frequent templates having the largest recorded number of fragments. The master extracted templates for the stacks are combined into a map that is then compared with background images to remove extracted templates matching segment in the background.

5 Claims, 12 Drawing Sheets

Collecting Training Images Using 3D Model Rendering

Collecting Training Images Using Image Database

Feature selection (Pruning) using LASSO

| Reuse the original set of training images that contain object instances (cars) from a specific viewpoint and have been aligned to a reference grid. Label each such image a positive sample. Collect a large number of background images from natural scenes that do not contain any car instances. Label each such image a negative sample. |
|---|

↓

| For each image in the combined (positive and negative) dataset, form an indicator vector x of length K, where K is the number of templates extracted from step 700. Each element in the vector x corresponds to a predetermined template in the template map (master map). If the learned template (from 700) is detected in a predetermined location, the corresponding element in x is labeled +1, otherwise -1. Assign class label y = 1 if the image is a positive sample or y = -1 if the image is a negative sample. |
|---|

↓

| Use LASSO to do two things simultaneously: 1) fit a regression model (equation (5) that predicts class label y using the indicator vector x; a specific case (linear regression) is discussed in our document but other regression models such as logistic regression can be used as well. 2) feature selection: prune features that are common both to foreground and background. |
|---|

↓

| Update the template map (master map) by removing pruned features. |
|---|

METHOD FOR DETECTING OBJECTS USING FLEXIBLE EDGE ARRANGEMENTS

CROSS-REFERENCE TO RELATED APPLICATIONS

This application claims priority from U.S. Provisional application No. 60/913,303 filed Apr. 23, 2007, the entire subject matter thereof being incorporated herein by reference.

TECHNICAL FIELD

This invention relates generally to method for detecting objects and more particularly methods for detecting objects of diverse or different shapes belonging to a generic class of such objects within a cluttered, natural background.

BACKGROUND AND SUMMARY

As is known in the art, detection of diverse objects in cluttered, natural scenes rapidly and accurately has many real-world applications such as robot navigation, human-computer interaction, image retrieval, and automated surveillance. One challenge is to deal with large variations in shape and appearance of the objects within an object category, as well as the variations resulting from changes in viewpoint, lighting and imaging device.

Many methods used to recognize objects have focused on texture-based interest-points, see for example, [K. Mikolajczyk, T. Tuytelaars, C. Schmid, A. Zisserman, J. Matas, F. Schaffalitzky, T. Kadir, and L. Van Gool. A comparison of affine region detectors. *IJCV*, 65(1-2), 2005]. These features are typically based on quantitative measurement of filter responses, and placed at informative regions such as corners, blobs and T-junctions. They have been used as the atomic input in the visual process of both the part-based model, see for example, [R. Fergus, P. Perona, and Z. Zisserman. Object class recognition by unsupervised scale-invariant learning. In *CVPR*. 2003] and the bag-of-features method see: [G. Csurka, C. Dance, L. Fan, J. Willamowski, and C. Bray. Visual categorization with bags of keypoints. In *ECCV Work-shop on Statistical Learning in Computer Vision*, 2004]; [L. Fei-Fei and P. Perona. A Bayesian hierarchical model for learning natural scene categories. In *CVPR*, 2005]; [K. Grauman and T. Darrell. Efficient image matching with distributions of local invariant features. In *CVPR*, 2005]; and [S. Lazebnik, C. Schmid, and J. Ponce. Beyond bags of features: Spatial pyramid matching for recognizing natural scene categories. In *CVPR*. 2006].

Although interest-points have been very effective on wide baseline matching and single object recognition see: [H. Bay, T. Tuytelaars, and L. Van Gool. SURF: Speeded up robust features. In *ECCV*, May 2006]; V. Lepetit, P. Lagger, and P. Fua. Randomized trees for real-time keypoint recognition. In *CVPR*, 2005]; and [D. G. Lowe. Distinctive image features from scale-invariant keypoints. *IJCV*, 60(2):91-110, 2004], they seem to be less optimal for categorical object detection. The main reason is that interest-points are designed to capture specific image structures, while an ideal feature representation should adapt to the shape that is common to the object category and exhibit different levels of complexities.

Recently, there has been an impressive body of work on using contour information to address these limitations. Shotton et al. [J. Shotton, A. Blake, and R. Cipolla. Contour-based learning for object detection. In *ICCV* 2005] explore an object detection system that exploits only contour fragment. Opelt et al. [A. Opelt, A. Pinz, and A. Zisserman. A boundary-fragment-model for object detection. In *ECCV*, 2006] propose the boundary-fragment-model (BFM). Both papers used Adaboost for feature selection. Ferrari et al. [V. Ferrari, T. Tuytelaars, and L. Van Gool. Object detection by contour segment networks. In *ECCV*, 2006] present a family of scale-invariant shape features formed by chains of connected and roughly straight contour segments. These methods focus on the object shape and demonstrated promising capability of dealing with appearance variations. In fact, contour-based features have been extensively used and can be dated back to the model-based recognition work in early years [E. Grimson. *From Images To Surfaces: A Computational Study of the Human Early Vision System*. MIT Press, Cambridge, Mass., 1981].

Other related techniques known in the art include: gradient histogram based features such as SIFT [D. G. Lowe. Distinctive image features from scale-invariant keypoints. *IJCV*, 60(2):91-110, 2004]; shape context [S. Belongie, J. Malik, and J. Puzicha. Shape matching and object recognition using shape contexts. *PAMI*, 24(4):509-522, 2002]; and HOG [N. Dalal and B. Triggs. Histograms of oriented gradients for human detection. In *CVPR*, 2005].

A work most related to the present invention is the local tag arrangement (LTA) proposed by Amit [Amit, D. Geman, and B. Jedynak. Efficient focusing and face detection. Technical Report 459, Department of Statistics, University of Chicago, 1997.] in the context of face detection. In their framework, local features are represented by spatial arrangements of edge fragments in a rectangular region.

In accordance with the present invention, a method is provided for generating a master map for a generic class of objects, comprising: selecting a subset of frequent templates from a template pool having a plurality of templates having various degrees of complexity; formulating feature selection algorithm to determine a most discriminative template from a pre-selected one of the templates in the template pool.

In one embodiment, the degree of complexity is controllable; and generating the master map from the formulated feature selection algorithm.

In one embodiment, the templates have segment regions, each one of such regions being adapted to have therein fragments having a predetermined size and one of a predetermined plurality of different spatial orientation and wherein the degrees of complexity is varied by the number of fragments in the templates.

In one embodiment, a method is provided for generating a master map for a generic class of objects. The method includes: (A) defining a template having segment regions, each one of such regions being adapted to have therein features having a predetermined size and one of a predetermined plurality of different spatial orientation; (B) obtaining images of different types of objects within the generic class of objects; such images being scaled to a common size and partitioned into image regions, each one of the image regions having a common region of the obtained images, such common region providing a region stack; (C) for each one of the region stacks: (a) applying the template to each one of the images in such region stack to extract, from each one of the images, features having the predetermined size and one of the predetermined plurality of different spatial orientations, to generate, for each one of the images in the region stack, an extracted template; (b) determining, from the extracted templates, a most frequent extracted template among the extracted templates having only a first predetermined number of features with a common spatial orientations; (c) recording the number of images in the region stack having the determined most frequent extracted template; (d) repeating (b) and (c) with successively increasing predetermined number of features until the number of recoded images falls below a predetermined threshold; (e) selecting as a master extracted template for such one of the region stacks, the one of the most frequent templates having the largest recorded number of features; (D) combining the master extracted templates for each one of the region stacks into a map for the class of objects; and (E) comparing the map with each one of a plurality of background images to remove, from the map master extracted, extracted templates therein matching segment characteristics of the background to produce the master map for the class of objects.

In one embodiment the features are edge fragments of the object.

In one embodiment, a method is provided for generating a master map for a generic class of objects. The method partitions images of different types of objects within a class into region stacks. For each one of the stacks, the method: (a) applies a template to extract fragments having a predetermined size and one of a plurality of different spatial orientations, to generate extracted templates; (b) determines, from the extracted templates, a most frequent one thereof having only a first number of fragments with a common spatial orientations; (c) records the number of images having the determined most frequent extracted template; (d) repeats (b) and (c) with successively increasing number of fragments until the number of recoded images falls below a threshold; and (e) selects as a master extracted template the one of the most frequent templates having the largest recorded number of fragments. The master extracted templates for the stacks are combined into a map that is then compared with background images to remove extracted templates matching segment in the background.

In one embodiment, a method is provided for generating a master map for a generic class of objects. The method defines a template having segment regions, each one of such regions being adapted to have therein fragments having a predetermined size and one of a predetermined plurality of different spatial orientation. The method obtains images of different types of objects within the generic class of objects; such images being scaled to a common size and partitioned into image regions, each one of the image regions having a common region of the obtained images, such common region providing a region stack. For each one of the region stacks, the method: (a) applies the template to each one of the images in such region stack to extract, from each one of the images, fragments having the predetermined size and one of the predetermined plurality of different spatial orientations, to generate, for each one of the images in the region stack, an extracted template; (b) determines, from the extracted templates, a most frequent extracted template among the extracted templates having only a first predetermined number of fragments with a common spatial orientations; (c) records the number of images in the region stack having the determined most frequent extracted template; (d) repeats (b) and (c) with successively increasing predetermined number of fragments until the number of recoded images falls below a predetermined threshold; and (e) selects as a master extracted template for such one of the region stacks, the one of the most frequent templates having the largest recorded number of fragment. The method combines the master extracted templates for each one of the region stacks into a map for the class of objects and then compares the map with a plurality of background images to remove, from the map master extracted, extracted templates therein matching segment characteristics of the background to produce the master map for the class of objects.

The present invention differs from LTA in a number of ways. First, the present invention captures long range line structures (e.g., edges) instead of isolated edge pixels. Second, the present invention learns feature templates with variable complexities instead of a fixed configuration. This property is crucial since it is desirable that the feature to adapt the object shape and avoid over/under-representation. Finally, the detection model in LTA is purely generative. It provides interpretable and repeatable features but the model discriminativity has been ignored. With the present invention, the method uses a hybrid of generative and discriminative model for feature selection. The learned features retain both interpretability and discriminativity.

In one embodiment, the method uses an edge-fragment based feature for object detection, where the term detection refers to both image categorization and object localization. The object is represented by a collection of templates. Each template is defined by a group of local edge fragments. In contrast to the traditional interest-point features, edge fragments can be detected stably on the object boundary despite large shape deformations, and can be matched largely invariant to illumination changes and object colors. What is more appealing is that edge detection and tracing are very efficient. By exploring the local and global edge configuration, the method can drastically reduce the object search into a few number of regions of interest (ROIs) with minimum computation and miss detections. More sophisticated classifiers can be further introduced to verify each preliminary detection.

The template is referred to as a Flexible Edge Arrangement Template (FEAT), as it offers a great deal of flexibility by varying the extent and orientation of individual edge fragments, as well as the number of edge fragments and their spatial distribution within each template. However, the richness of this template pool also renders feature selection a daunting challenge. The task is to choose a minimal subset of templates that best capture the object shape, while being distinguishable from other non-objects. As noted above, the method starts from a subset of templates. The subsets are selected independently on some spatial bins. At a second stage, the method considers the joint feature statistics and uses discriminate analysis to determine the optimal feature set.

The template assumes no a priori semantical or geometrical content, and can be conceptually applied to any object with distinctive shapes.

A significant difference between the method according to the invention and techniques previously used is that the latter ones are all feature descriptors, while FEAT is more like a feature detector. The method uses greedy search to construct object-specific FEATs during training. In detection, the process localizes those features purposefully instead of relying on any generic detectors such as Difference Of Gaussian (DOG) or Harris corner. The feature can be combined with the well-established local descriptors for further discrimination.

Other features, objects, and advantages of the invention will be apparent from the description and drawings, and from the claims.

DESCRIPTION OF DRAWINGS

FIG. 1C is a flowchart of a process Feature Selection (Pruning) using the Least Absolute Shrinkage and Selection Operator (LASSO) used in the process of FIG. 1 according to one embodiment of the invention;

FIG. 2C shows a template according to the invention used in the process of FIG. 1 and used to extract edge segments for a different region or different type of the object within the class of objects;

FIG. 2D shows a template according to the invention used in the process of FIG. 1 and used to extract edge segments for still a different region or different type of the object within the class of objects;

Like reference symbols in the various drawings indicate like elements.

DETAILED DESCRIPTION

Figure 1:
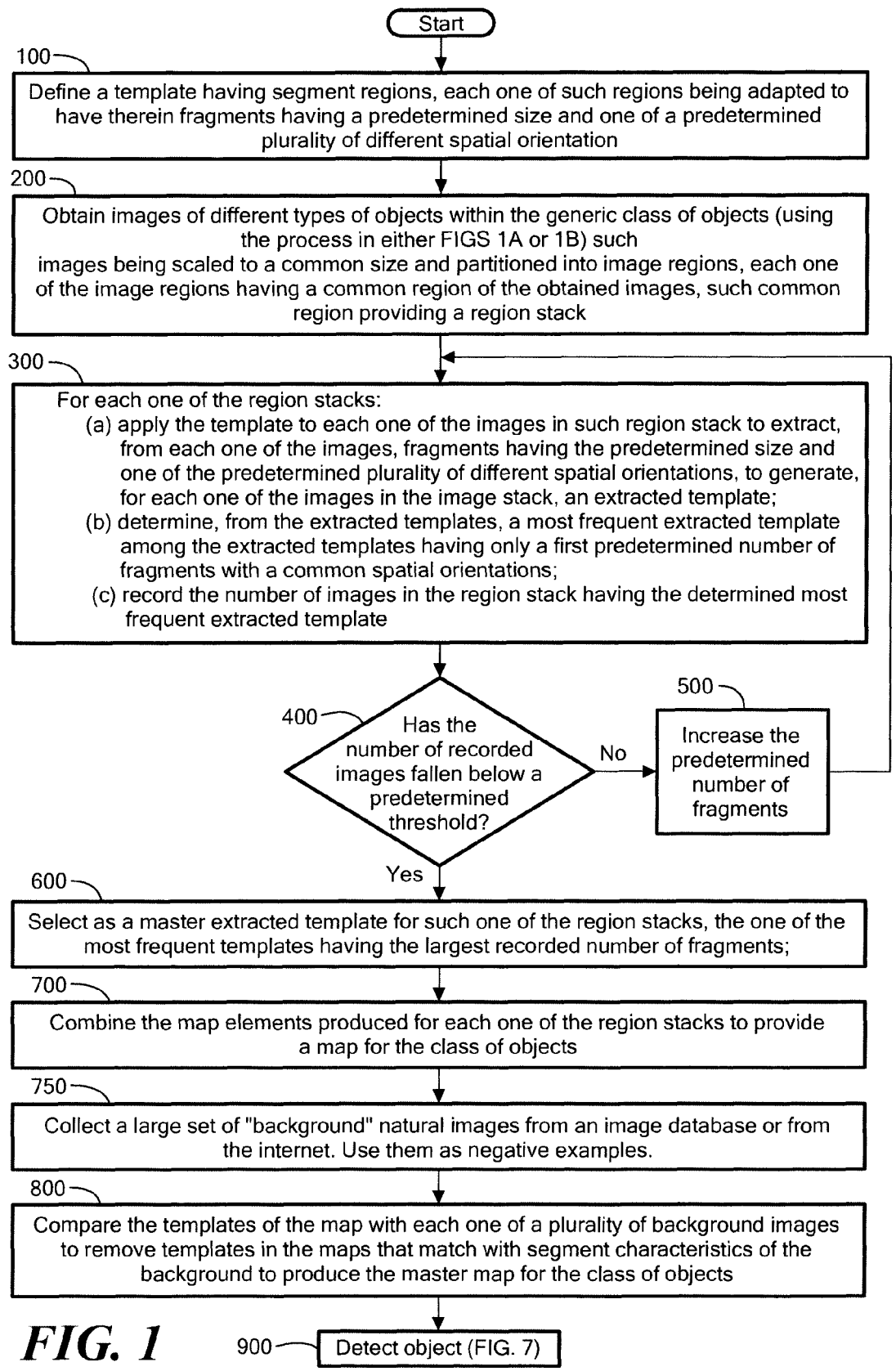
FIG. 1 is a flowchart of a process for detecting objects of diverse or different shapes belonging to a generic class of such objects within a cluttered, natural background according to one embodiment of the invention.

Referring now to the flowchart in FIG. 1, the method for generating a master map for a generic class of objects, comprises defining a template 10 (FIG. 2A) having segment regions 12, each one of such regions 12 being adapted to have therein fragments, here edges of an object in an image, here an image of a car, such fragments having a predetermined size, here five to ten pixels in length, and one of a predetermined plurality of different spatial orientation, here horizontal, vertical, +45 degree; and +135 degree orientations, Step 100.

Thus, in this example, a star like template is selected. The template has a central origin segment region $12_O$ and a plurality of pie shaped wedges segment regions 12 extending radially outwardly from the origin. Here there are eight wedge shaped segment regions 12 regularly spaced circumferentially about the central origin.

The basic ingredient in this representation is the so-called ϵ-edge, which is defined as a straight edge fragment whose extent is at least pixels. A straightforward construction of ϵ-edges starts with edge detection, e.g., Canny with hysteresis [see, for example, J. Canny. A computational approach to edge detection. *PAMI,* 8(6):679-698, 1986].

Figure 2A:
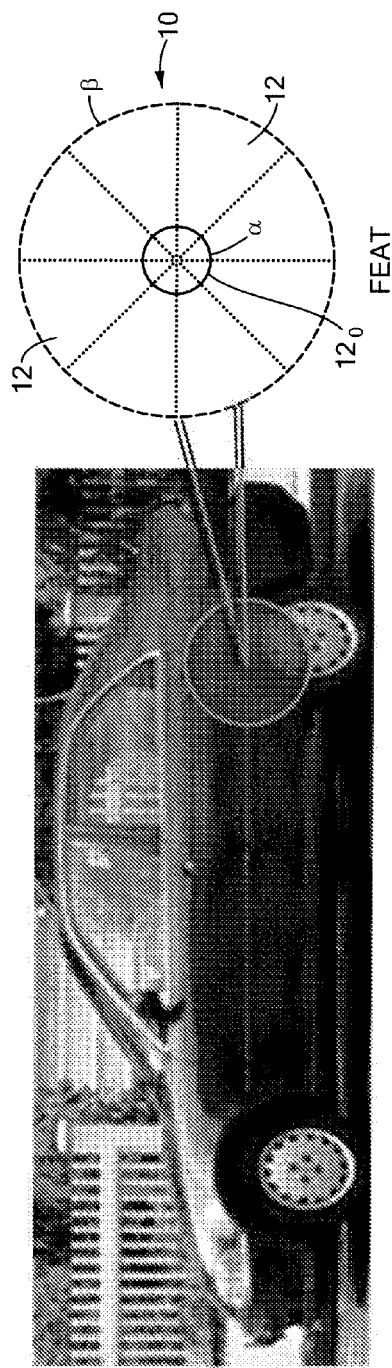
FIG. 2A shows a template according to the invention used in the process of FIG. 1.
Figure 2B:
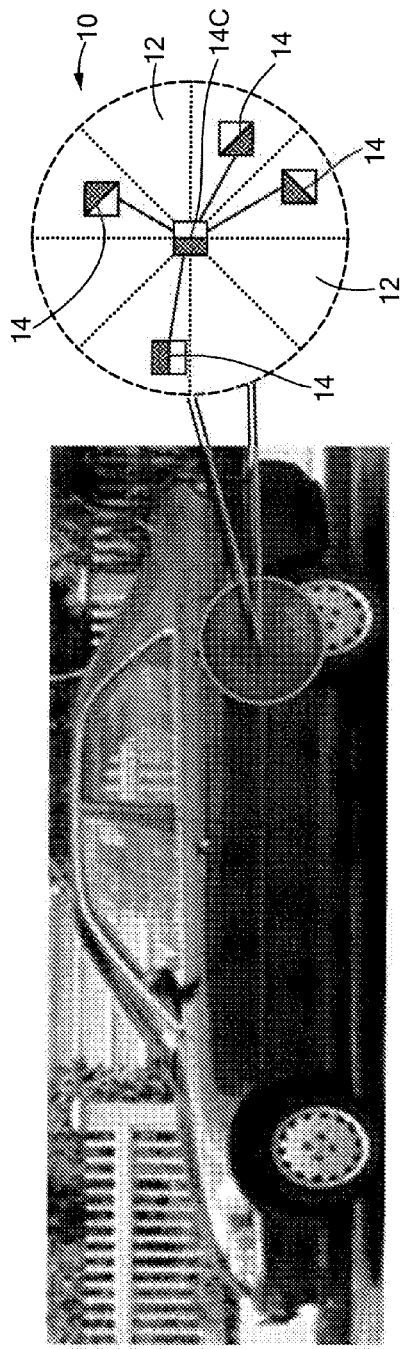
FIG. 2B shows a template according to the invention used in the process of FIG. 1 and used to extract edge segments for a region of an object within the class of objects.

Here, in the car example referred to above, the feature or signature is constructed having a center ϵ-edge, labeled 14C in FIG. 2B, and k disjoint ϵ-edges, labeled 14 in FIG. 2B, here in this example, k=4 disjoint ϵ-edges confined to lie in the surrounding log-polar bins, forming a star-like configuration. It is noted that ϵ is the length of the edges in units of pixels. Here, for example, ϵ, is five to ten pixels in length. The template 10 (FIG. 2A) is applied to the image to extract edge fragments 14 in a region of the image, such fragments having the predetermined size and one of the predetermined plurality of different spatial orientations, as shown in FIG. 2B. More particularly, the ϵ-edges are traced and labeled at four orientations, namely, horizontal ($\epsilon_H$), vertical ($\epsilon_V$), and two diagonals, (i.e., a diagonal at +45 degrees ($\epsilon_{D+45}$) and a diagonal at +135 degrees ($\epsilon_{D+135}$)). In order to deal with the intensity variation, the process excludes the edge polarity in this representation. With this construction a pixel can be included in multiple ϵ-edges, thus preserving all the available details. Obviously, all the edge pixels are 1-edge, i.e., ϵ=1. As ϵ increases, less number of edge fragments is retained, and their discriminativity increases.

Individual edge fragments as represented by ϵ-edges convey very little information for discriminating between different shape classes. However, their spatial interactions in a local neighborhood can be more informative. Motivated by this observation, the process uses a feature or signature template that consists of ϵ-edges). This feature, i.e., FEAT, has, as noted above, a center ϵ-edge, and k disjoint ϵ-edges confined to lie in the surrounding log-polar bins, forming a star-like configuration. FIG. 2A illustrates the configuration of FEAT defined in the log-polar coordinate system. The radial range is delimited by α and β, while the angular range is divided into eight bins.

FIG. 2C shows the effect of applying the template of FIG. 2A to either a different region of the same car or to an image of a different type of car to extract edge fragments 14 therefrom. Note that the spatial orientations of the edge fragments 14 are different from that in FIG. 2B. FIG. 2D shows the effect of applying the template of FIG. 2A to either a different region of the same car or to an image of a different type of car. Note that the spatial orientations of the edge fragments are different from that in FIG. 2B and that the number of neighboring edge fragments is greater than the number in FIGS. 2B and 2C.

There are several advantages for using this feature. First, edge detection is computationally efficient compared to other sophisticated interest-point detectors. Second, edges exhibit strong invariance to photometric transformations, and the star-shape configuration explicitly encodes variations in local geometry. Finally, the template complexity can be controlled by varying ϵ and k. That is, the complexity of the template 10 can be varied by changing the number of edges, k, and/or by varying the length of the edge, i.e., the number of pixels in edges, ϵ. Here, in this example, the number of edges, k, is varied to thereby vary the complexity of the template 10. As will be observed later, this allows us to construct features that are highly detectable on the object. It should be understood that features other than edges may be used such as corners. Thus, in such case the degree of complexity is a function of the number of corners used.

Referring again to FIG. 1, the method obtains images of different types of objects within the generic class of such objects, Step 200. The generic class of objects may be people, in which case images of people of various sizes and shapes are obtained. Here, in the example, the generic class of images of cars, and images are obtained of sedans, coupes, of various models made by various manufacturers.

Figure 1A:
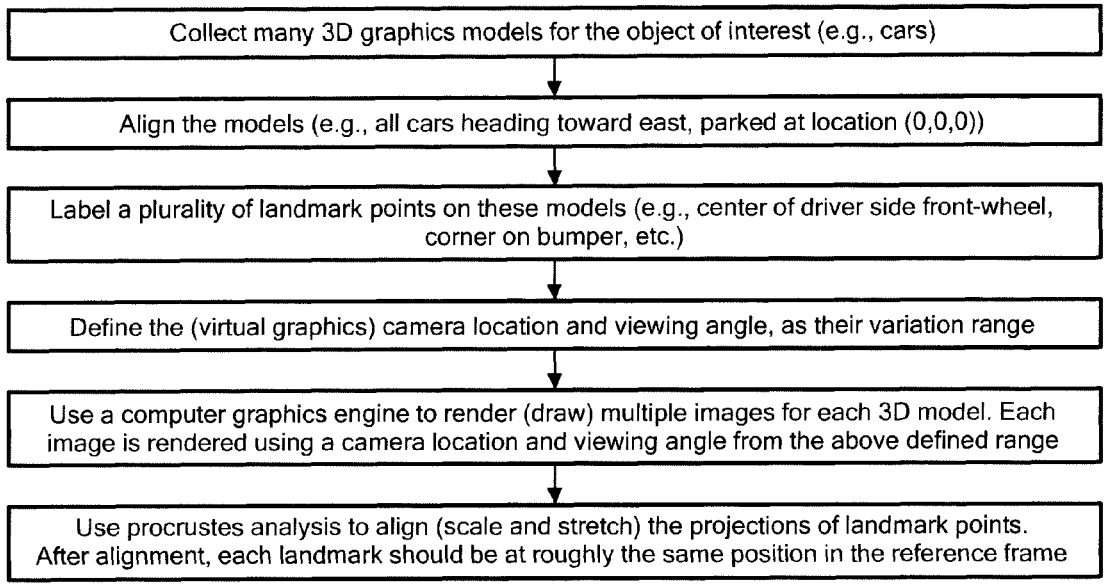
FIG. 1A is a flowchart of a process for collecting training images using 3D model rendering used in the process of FIG. 1 according to one embodiment of the invention.
Figure 1B:
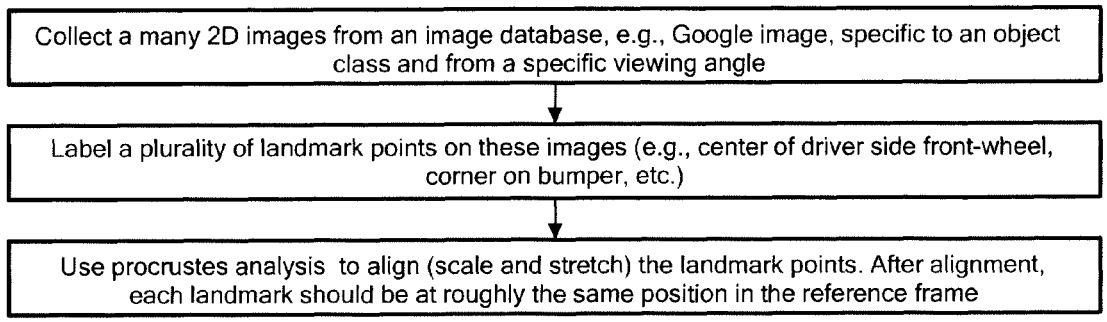
FIG. 1B is a flowchart of a process for collecting training images using image database according to another embodiment of the invention.

More particularly, the step 200 of obtaining images of different types of objects within the generic class of such objects may be for example, the process shown by the flowcharts in FIG. 1A or by the flowchart shown in FIG. 1B.

Referring to FIG. 1A, the flowchart shows the steps of collecting training images using 3D Model Rendering. The method includes: Collecting many 3D graphics models for the object of interest (e.g., cars); Aligning the models (e.g., all cars heading toward east, parked at location (0,0,0)); Labeling a plurality of landmark points on these models (e.g., center of driver side front-wheel, corner on bumper, etc.); Defining the (virtual graphics) camera location and viewing angle, and their variation range; Using a computer graphics engine to render (draw) multiple images for each 3D model. Each image is rendered using a camera location and viewing angle from the above defined range; and, Using procrustes analysis to align (scale and stretch) the projections of landmark points. After alignment, each landmark should be at roughly the same position in the reference frame.

Referring to FIG. 1B, the flowchart shows the steps of collecting training images by collecting training images using an image database. The method includes: Collect many 2D images from an image database, e.g., Google image, specific to an object class and from a specific viewing angle; Label a plurality of landmark points on these images (e.g., center of driver side front-wheel, corner on bumper, etc.); Use procrustes analysis to align (scale and stretch) the landmark points. After alignment, each landmark should be at roughly the same position in the reference frame.

Next, (Step 300) the obtained images from FIG. 1A or 1B (Step 200) or both are scaled to a common size and partitioned into an array of image regions. Each one of the image regions has disposed therein a common region of the obtained images, such common region providing a region stack. Consider a set of N images (FIG. 3) of a particular object class, here, cars. The task is to learn a set of sparse templates that best describe the object shape. To achieve this, we need to answer three questions:

First, at which locations should we define these templates?
Second, what is the configuration of each template?
Finally, what is the minimum number of templates that are sufficient for detection?

For each one of the region stacks, the method (Step 300): (a) applies the template to each one of the images in such region stack to extract, from each one of the images, fragments having the predetermined size and one of the predetermined plurality of different spatial orientations, to generate, for each one of the images in the region stack, an extracted template; (b) determines, from the extracted templates, a most frequent extracted template among the extracted templates having only a first predetermined number of fragments with a common spatial orientations; (c) records the number of images in the region stack having the determined most frequent extracted template; (d) repeats (b) and (c) with successively increasing predetermined number of fragments until the number of recoded images falls below a predetermined threshold (Steps 400 and 500; and (e) selects as a master extracted template for such one of the region stacks, the one of the most frequent templates having the largest recorded number of fragment (Step 600).

Figure 3:
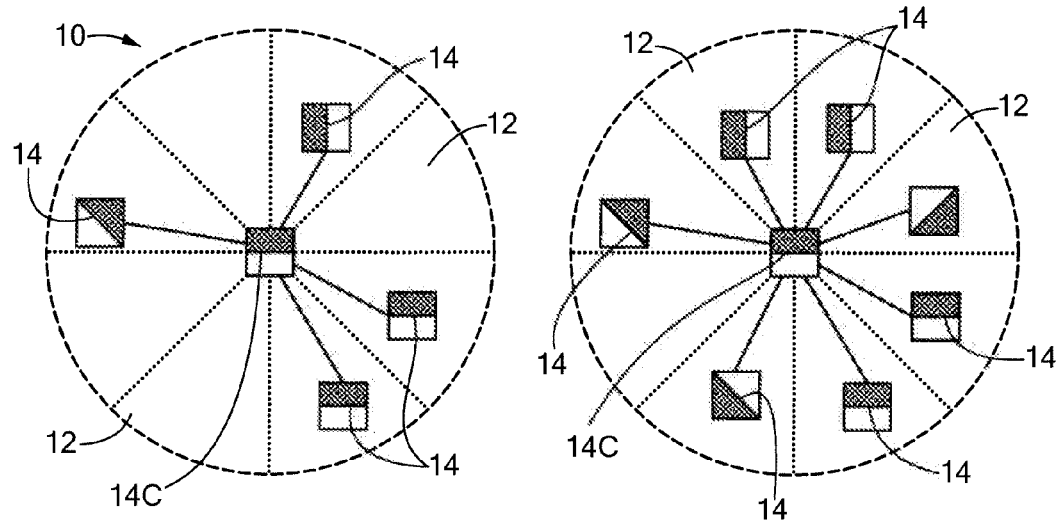
FIG. 3 shows a stack of images of different type of the object within the class of objects and used in the process of FIG. 1.
Figure 3:
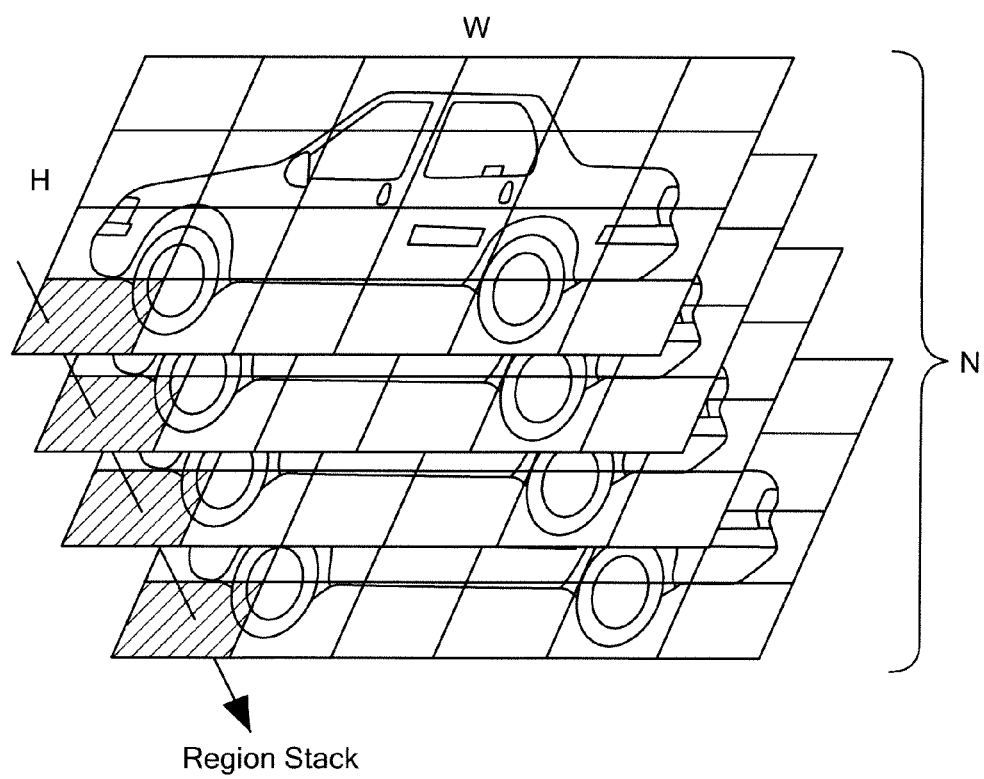

Here, the object shape is defined on a W×H reference grid G as shown in FIG. 3. Consider the set of N sub-regions at a particular grid location after each image has been warped to the grid. This set of N sub-regions across the images is referred to as a region stack. This region stack can be viewed as a sample from a shape random variable that characterizes a particular location on the object contour. The process identifies the FEAT as the most frequent template in the region stack, i.e., $$\hat{t}_i = \underset{t}{\operatorname{argmax}} \frac{N_i(t)}{N} \quad (1)$$

where $N_i(t)$ is the number of occurrences of template t at the i th sub-region. The term $\hat{t}_i$ is referred to as the region's characteristic FEAT; it denotes both the location (center of the sub-region), and the configuration of the template. The process searches for the characteristic FEAT at each region stack. The final object shape can be represented by $\hat{T}=\{\hat{t}_1, \hat{t}_2, \ldots, \hat{t}_K\}$, where K is the grid size. Note that instances of $\hat{t}_i$ could appear at different locations in the subregions that contains them. Multiple instances of $\hat{t}_i$ could appear at the same sub-region. Here, the process constrains the center edge $\epsilon_0$ to be inside the sub-region, but the neighboring edges can 'float' arbitrarily as long as they are in the pre-specified radial bins.

Two parameters need to be considered during FEAT learning. One is the template complexity, which is defined by k, the number of neighboring $\epsilon$-edges. Trivial templates such as 2-edge arrangement are too primitive to capture the object shape, while over complex templates are too specific. Therefore, the process only uses search templates in a pre-defined range $[k_{min}, k_{max}]$ ([Y. Amit, D. Geman, and B. Jedynak. Efficient focusing and face detection. Technical Report 459, Department of Statistics, University of Chicago, 1997, J. Canny. A computational approach to edge detection. *PAMI*, 8(6):679-698, 1986]. The second parameter is the frequency of the characteristic FEAT. Here the process ignores the characteristic FEATs whose frequency is below a threshold $\delta$ since they are more likely to be random noise.

Now let us consider the size of the template space. Since the process uses 4 edge orientations and 8 angular bins, the number of distinct k-star templates is $$M_k = \binom{8}{k} 4^{k+1}.$$

In the worst case, the number of templates the process needs to examine in one region stack is $$M = \sum_{k=2}^{5} M_k = \sum_{k=2}^{5} \binom{8}{k} 4^{k+1} = 317{,}184 \quad (2)$$

Due to the large number of $\epsilon$-edges possibly detected in one sub-region, naive search over this template space would be prohibitively expensive. The process takes an approximate approach to search the template in a stagewise manner:

---
Algorithm 1 Forward Stagewise Search for the FEAT
---

Parameters:
    frequency threshold $\delta$, complexity threshold $k_{max}$.
Initialization:
    Set $t = \epsilon_0 \epsilon_1$, the most frequent two-edge arrangement. Record all
    the instances at which t has occurred for each image. Set $k = 2$.
    Denote $\Delta(t)$ the frequency of template t.
while $\Delta(t) > \delta$ and $k < k_{max}$ do
    1. Search over all possible additions of one edge $\epsilon_k$ that can be
    connected to $= \epsilon_0$ and located in a disjoint angular bin
    from $\epsilon_1,...,\epsilon_{k-1}$
    2. Find the most frequent addition $\hat{\epsilon}_k$. Set $t \cup = \hat{\epsilon}_k$.
    3. Record all the instances of t. Set $k = k + 1$.
end while

---

As explained in Algorithm 1 above, the process constructs the template incrementally until the number of its occurrences is below a threshold or the maximum complexity is reached. Note that the construction of any additional edge is based on all the instances that have passed the previous test.

Figure 4:
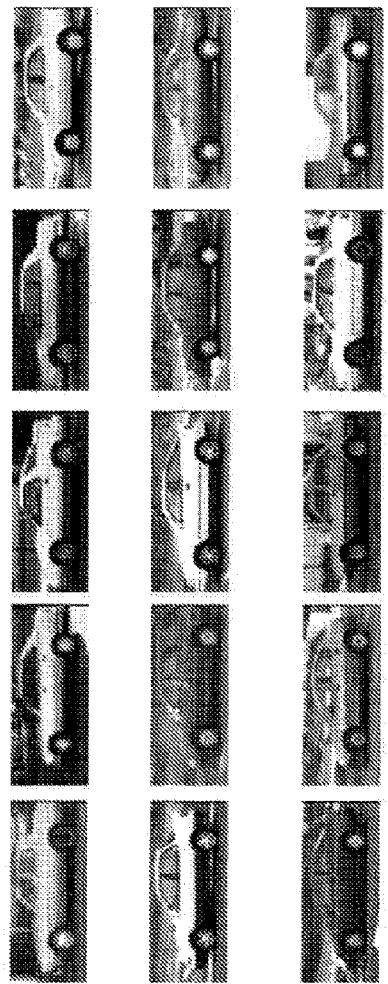
FIG. 4 shows a plurality of different type of the object within the class of objects and used in the process of FIG. 1 having applied thereto the template of FIG. 2.
Figure 4:
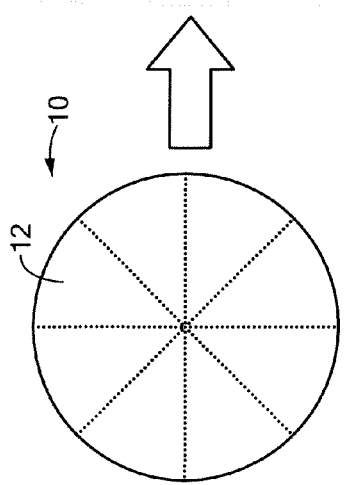
Figure 4A:
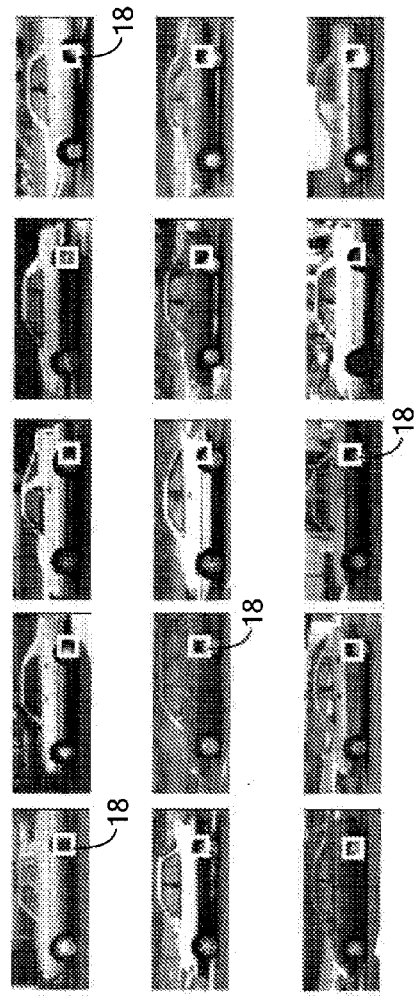
FIGS. 4A-4D show the effect of applying the template of FIG. 2 to the plurality of different type of the object of FIG. 4 and used to obtain a master fragment template for a region stack of the stack of images of FIG. 3.
Figure 4A:
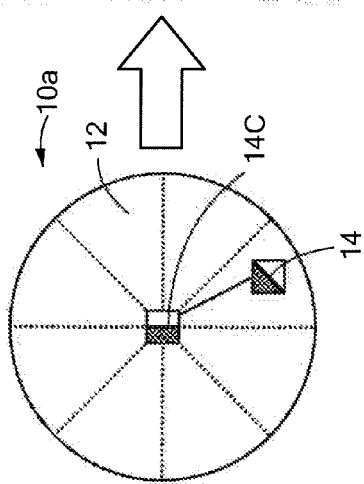

Thus, referring to FIG. 4A, and considering for example the region stack 18 for fifteen different types of cars, the method applies the template to each one of the images in such region stack to extract, from each one of the images, fragments having the predetermined size and one of the predetermined plurality of different spatial orientations, to generate, for each one of the images in the region stack, an extracted template. The process then determines, from the extracted templates, a most frequent extracted template among the extracted templates having only a first predetermined number of fragments, here only two fragments (k=2) with common spatial orientations. Here, in this example, the most frequent extracted template among the extracted templates having only a first predetermined number of fragments with a common spatial orientation is shown in FIG. 4A as template 10a. The process records the number of images in the region stack having the determined most frequent extracted template, here all fifteen images have the template 10a in the region stack 18.

Figure 4B:
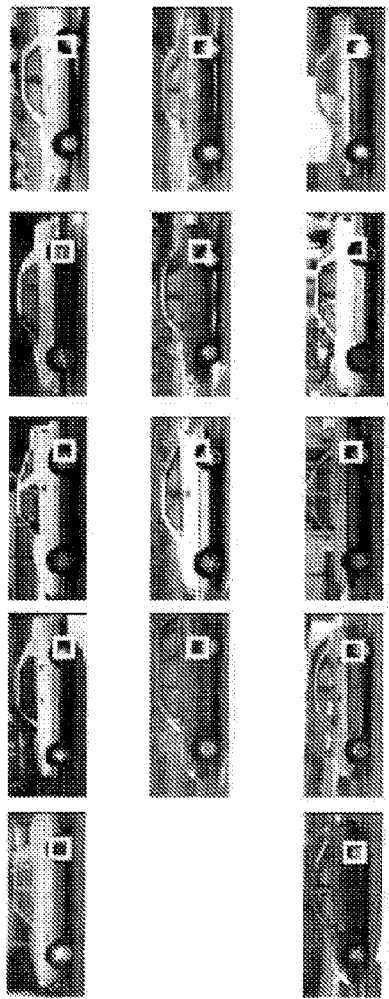
Figure 4B:
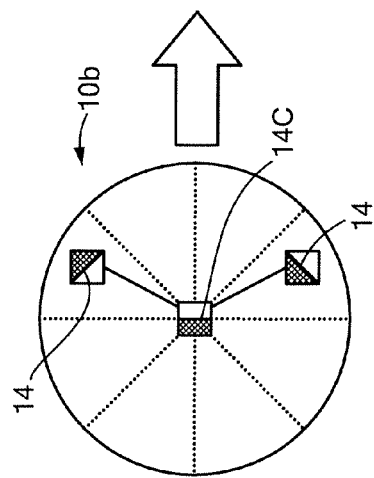
Figure 4C:
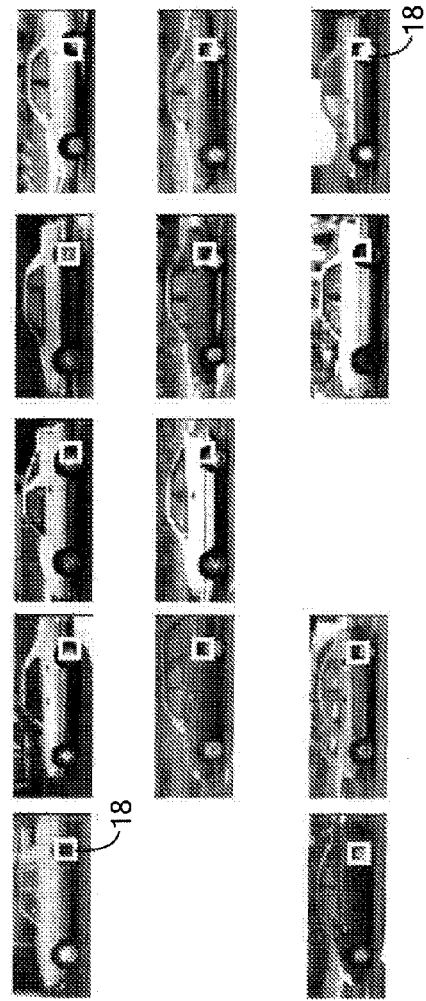
Figure 4C:
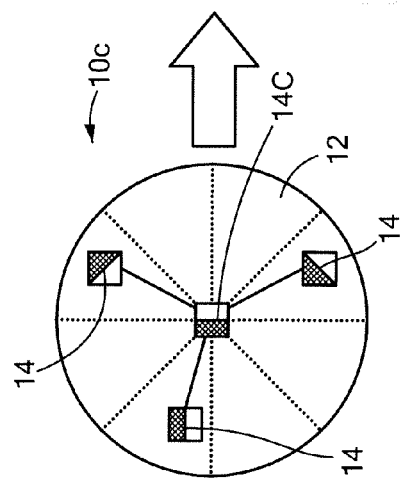
Figure 4D:
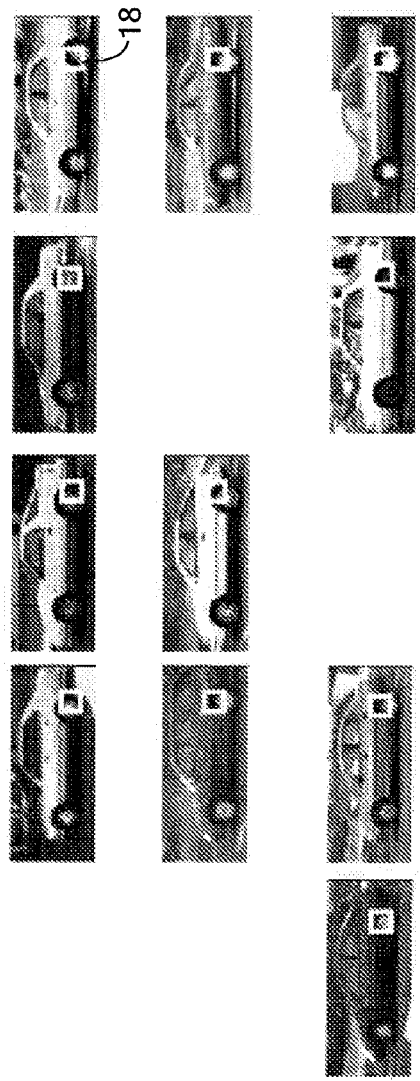
Figure 4D:
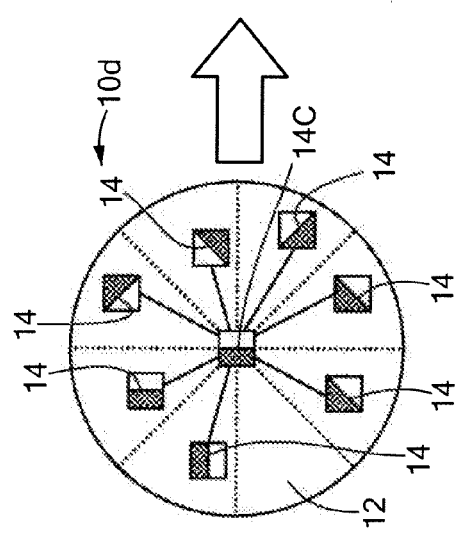

The process repeats this with successively increasing predetermined number of fragments, i.e., complexity, until the number of recoded images falls below a predetermined threshold; and (e) selects as a master extracted template for such one of the region stacks, the one of the most frequent templates having the largest recorded number of fragment. Thus, as shown in FIG. 4B the number is increased from two fragments, k=2, to three fragments, k=3, with a common spatial orientations. Here, in this example, the most frequent extracted template among the extracted templates having only a first predetermined number of fragments with a common spatial orientation is shown in FIG. 4B as template 10b. The process records the number of images in the region stack having the determined most frequent extracted template, here only fourteen images have the template 10a in the region stack 18. Thus, as shown in FIG. 4C the number is increased from three fragments to four fragments, k=4, with a common spatial orientation. Here, in this example, the most frequent extracted template among the extracted templates having only a first predetermined number of fragments with a common spatial orientation is shown in FIG. 4C as template 10c. The process records the number of images in the region stack having the determined most frequent extracted template, here only thirteen images have the template 10a in the region stack 18. As shown in FIG. 4D the number is increased from four fragments to eight fragments, k=8, with common spatial orientations. Here, in this example, the most frequent extracted template among the extracted templates having only a first predetermined number of fragments with a common spatial orientation is shown in FIG. 4D as template 10d. The process records the number of images in the region stack having the determined most frequent extracted template, here only eleven images have the template 10a in the region stack 18.

Figure 5:
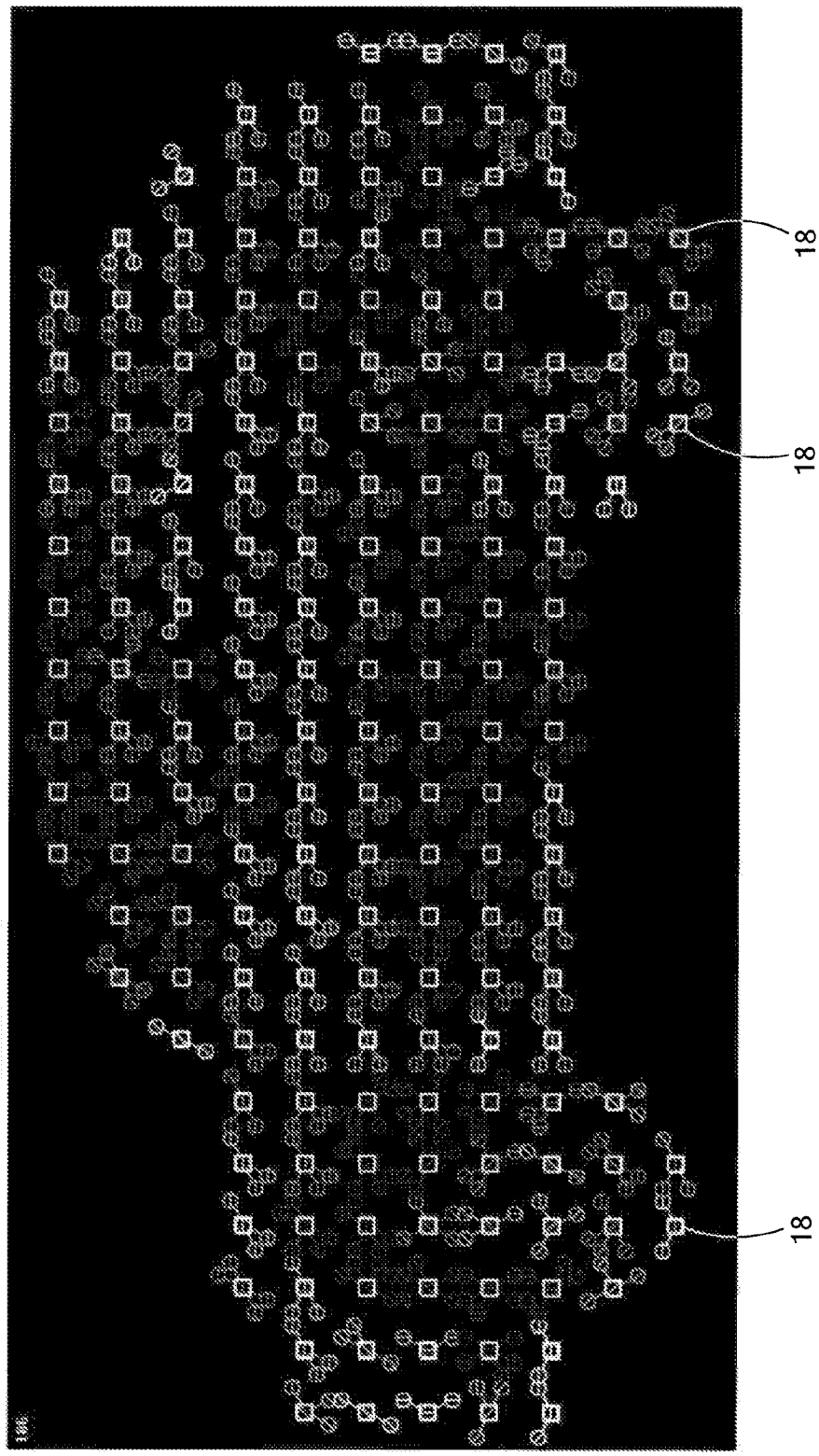
FIG. 5 shows a map of the object after combining master fragments for all of the image stacks of the objects produced in accordance with the invention.

The method then combines the fragments produced for each one of the region stacks to provide a map for the class of objects as shown in FIG. 5, Step 700.

Next, the method collects a large set (i.e. a plurality) of "background" natural images from an image database or from the internet, for example and uses them as negative samples, Step 750, as will be described below in connection with FIG. 1C.

Figure 6:
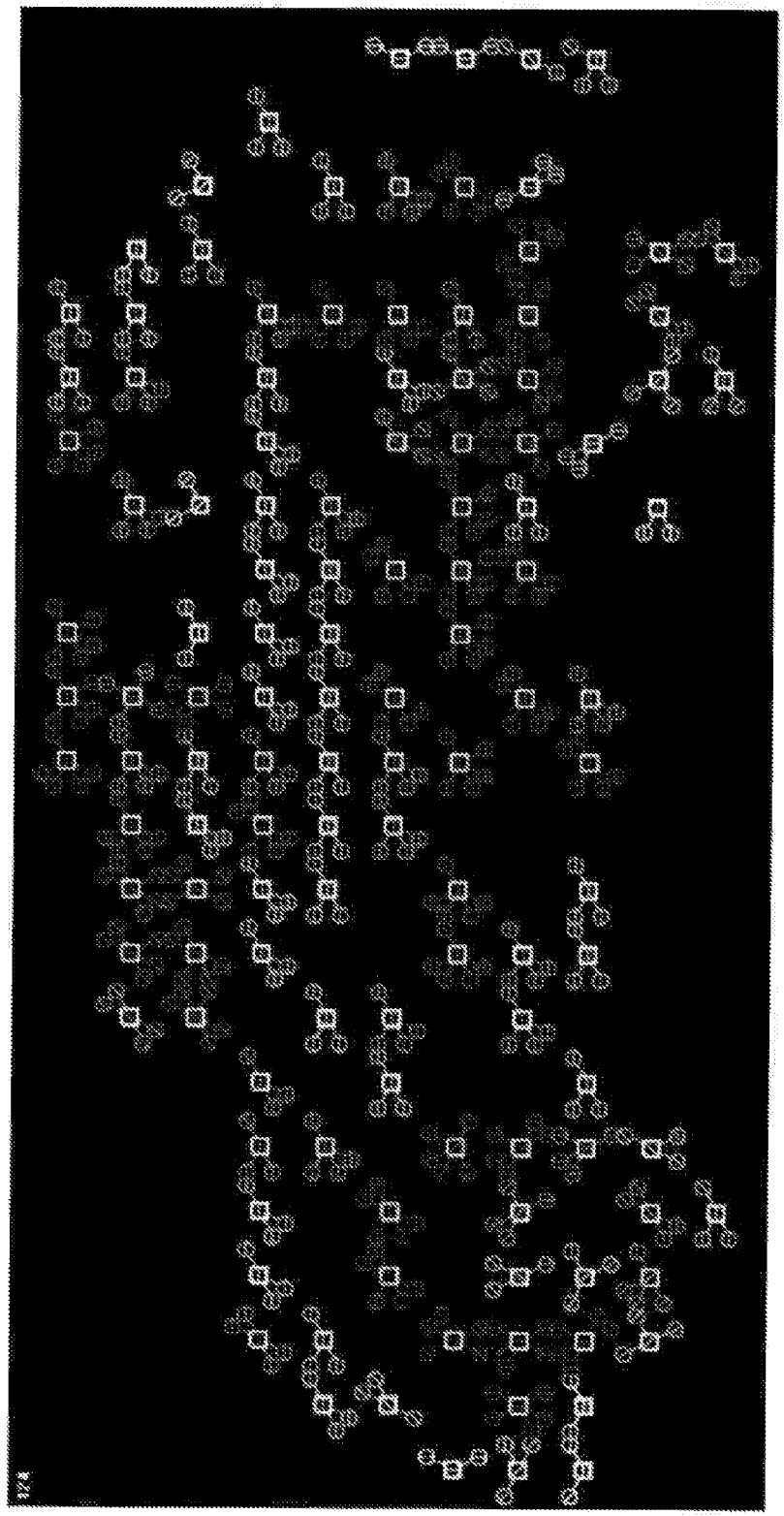
FIG. 6 shows a map of the object after the map of FIG. 5 has the effects of non-discriminative fragments removed therefrom in accordance with the invention after portions of features being pruned/after feature selection by incorporating negative samples provided by the background images.

Next, the method compares the map with the collected plurality of background images to remove extracted templates in the maps that match with segment characteristics of the background to produce the master map for the class of objects (FIG. 6), Step 800.

Referring to FIG. 1C, the flowchart shows the steps of Feature Selection (Pruning) using LASSO. The steps include:

(A) Reusing the original set of training images in FIG. 1A or FIG. 1B or both FIGS. 1A and 1B that contain object instances (cars) from a specific viewpoint and have been aligned to a reference grid. Labeling each such image a positive sample. Collecting a large number of background images from natural scenes that do not contain any object instances. Labeling each such image a negative sample;

(B) For each image in the combined (positive and negative) dataset, forming an indicator vector x of length K, where K is the number of templates extracted from Step 700. Each element in the vector x corresponds to a predetermined template in the template map (master map). If the learned template (from Step 700) is detected in a predetermined location, the corresponding element in x is labeled +1, otherwise −1. Assign class label y=−1 if the image is a positive sample (containing object instances) or y=−1 if the image is a negative sample (not containing object instances, or "background");

(C) Using LASSO to do two things simultaneously: 1) fit a regression model (equation (5)) that predicts class label y using the indicator vector x; a specific case (linear regression) is discussed in our document but other regression models such as logistic regression can be used as well. 2) feature selection: prune features that are common both to foreground and background; and (D) Updating the template map (master map) by removing pruned features.

To put it another way, the learned characteristic FEATs (Steps 300-600) only consider the feature existence in the positive samples and are purely data driven. However, in a detection task, one should also consider the negative samples for best classification. Here, the process uses discriminative analysis to choose a subset of $\hat{T}$ such that the selected features achieve both repeatability and discriminativity. Specifically, the process uses the Least Absolute Shrinkage and Selection Operator (LASSO) algorithm for feature selection. LASSO was first introduced by Tibshirani [R. Tibshirani. Regression shrinkage and selection via the lasso. *Journal of the Royal Statistical Society*, 58(1):267-288, 1996.] to achieve shrinkage and variable selection for linear regressions. More recently, it has been adopted in machine learning for feature selection, and has shown excellent generalization performance in the presence of many irrelevant features [J. Shotton, A. Blake, and R. Cipolla. Feature selection, $L_1$ vs. $L_2$ regularization, and rotational invariance. In *ICML*, 2004], [J. Goodman. Exponential priors for maximum entropy models. In *ACL*, 2004].

Consider a supervised learning task where P training samples $\{(X^{(i)}, y^{(i)}, i=1, \ldots, P\}$ are obtained. Here, $y^{(i)}$ is the class label and defined as $$y^{(i)} = \begin{cases} +1 & \text{sample } i \in \text{object class} \\ -1 & \text{otherwise} \end{cases} \quad (3)$$

and $X^{(i)} = \{x_1^{(i)}, \ldots, x_K^{(i)}\}$ is an indicator vector, where $$x_j^{(i)} = \begin{cases} +1 & \hat{t}_j \text{ is detected in sample } i \text{ at sub-region } j \\ -1 & \text{otherwise} \end{cases} \quad (4)$$

Consider the linear regression model: given K indicator variables, the object class can be predicted by $$\hat{y} = \hat{\beta}_0 + \hat{\beta}_1 x_1 + \ldots + \hat{\beta}_K x_K \quad (5)$$

Letting $\hat{\beta}\{\hat{\beta}_0, \hat{\beta}_1, \ldots, \hat{\beta}_K\}$, the LASSO estimate $\hat{\beta}$ is defined by $$\hat{\beta} = \operatorname*{argmin}_{\beta} \left\{ \sum_{i=1}^{P} \left( y^{(i)} - \beta_0 - \sum_{j=1}^{K} \beta_j x_j^{(i)} \right)^2 \right\} \quad (6)$$

$$\text{s.t.} \sum_{j=1}^{K} |\beta_j| \le s$$

Figure 7:
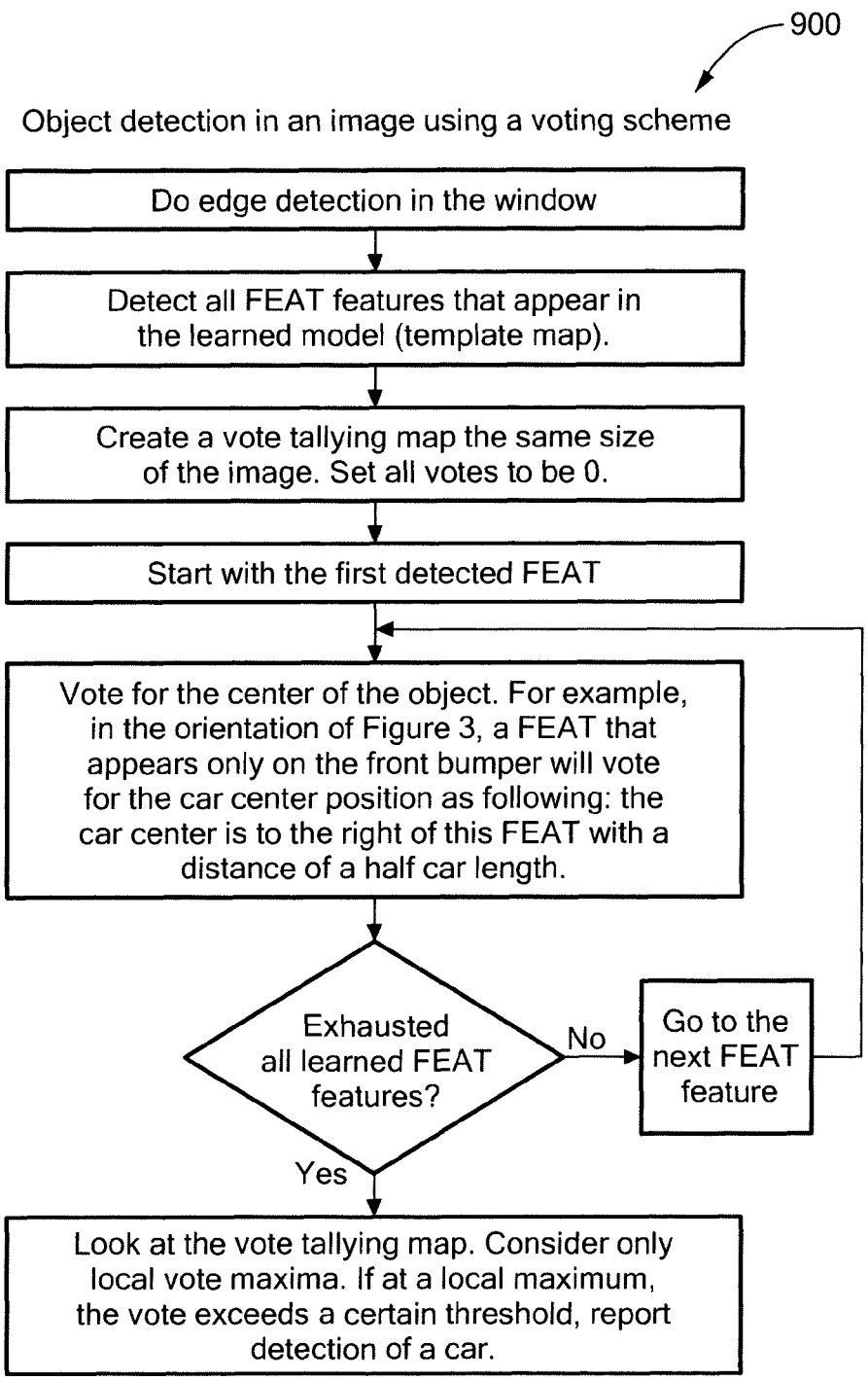
FIG. 7 is a flowchart of the process of object detection in an image using a voting scheme according to the invention used in the process of FIG. 1.

The LASSO minimizes the residual sum of squares subject to the sum of the absolute value of the coefficients being less than a constant. Here $s \ge 0$ is a tuning parameter. It controls the amount of shrinkage that is applied to the estimates. A geometric interpretation to LASSO is shown in FIG. 7. The ellipses are the error contours. The shaded areas are the constraints. $\hat{\beta}$ is the least square solution. As the process decreases s, LASSO will shrink the solutions towards 0, and some coefficients may be exactly equal to 0 (where the error contour touches the corner of the constraint region). This property is desirable as the surviving coefficients produce a simple and parsimonious feature subset for prediction. Surprisingly, as shown by Tibshirani [R. Tibshirani. Regression shrinkage and selection via the lasso. *Journal of the Royal Statistical Society*, 58(1):267-288, 1996.], LASSO has consistently low prediction errors than least squares and is competitive with other models such as ridge regression and subset selection [T. Hastie, R. Tibshirani, and J. Friedman. *The Elements of Statistical Learning*. Springer-Verlag, 2001.]. In addition, LASSO produces interpretable models and exhibits strong stability.

Computation to the solution to Eqn. 6 is a quadratic programming problem with linear inequality constraints. It is very inefficient when the number of features is large. More recently, Efron et al. [B. Efron, T. Hastie, I. Johnstone, and R. Tibshirani. Least angle regression. *The Annals of Statistics*, 32(2):407-499, 2004.] show in their breakthrough work that this problem can be efficiently solved by the least angle regression (LARS) algorithm. The process computes the indicator vector $X^{(i)}$ for 270 positive and 300 negative training images. The process uses LARS to select features from the learned characteristic FEATs.

The learned FEAT map consists of a set of characteristic FEATs, each of which is associated with a grid location. Although the discriminative power of an individual FEAT is low, the spatial distribution of FEATs gives a strong indication of the presence or absence of the object.

Each individual FEAT can be viewed as a feature detector. The process stores FEATs in a tree data structure. Feature detection can be performed efficiently by the depth-first-search. Given an input image, the process first detects all the instances of the learned FEATs. Instances of the object can be located using the Hough transform. In order to accommodate certain amounts of shape variation, the process deforms the reference grid in the range of scale [0.8,1.2], rotation [−7°,+7°], and translation ±5 pixels. The vote from a specific FEAT is splatted into a circular region around the object center. The size of the region can be determined by the amount of the deformation.

Since the model is trained with cars facing left, the detector is run over each image twice, the second time on the horizontally flipped image. Cars of different sizes can be detected by applying the detector at multiple scales.

More particularly, referring to FIG. 7, a flowchart of the process of object detection in an image using a voting scheme (Step 900, FIG. 1). The process first performs edge detection in the window. Next, the process detects all FEAT features that appear in the learned model (template map). Next, the process creates a vote tallying map the same size of the image. The process sets all votes to be 0. Next, the process starts with the first detected FEAT. Next, the process votes for the center of the object. For example, in the orientation of FIG. 3, a FEAT that appears only on the front bumper will vote for the car center position as following: the car center is to the right of this FEAT with a distance of a half car length. The process determines whether all learned FEAT features have been exhausted. If not, the process goes to the next FEAT feature; otherwise, the process looks at the vote tallying map; considers only local vote maxima; and if at a local maximum, the vote exceeds a certain threshold, report detection of a car.

Figure 1D:
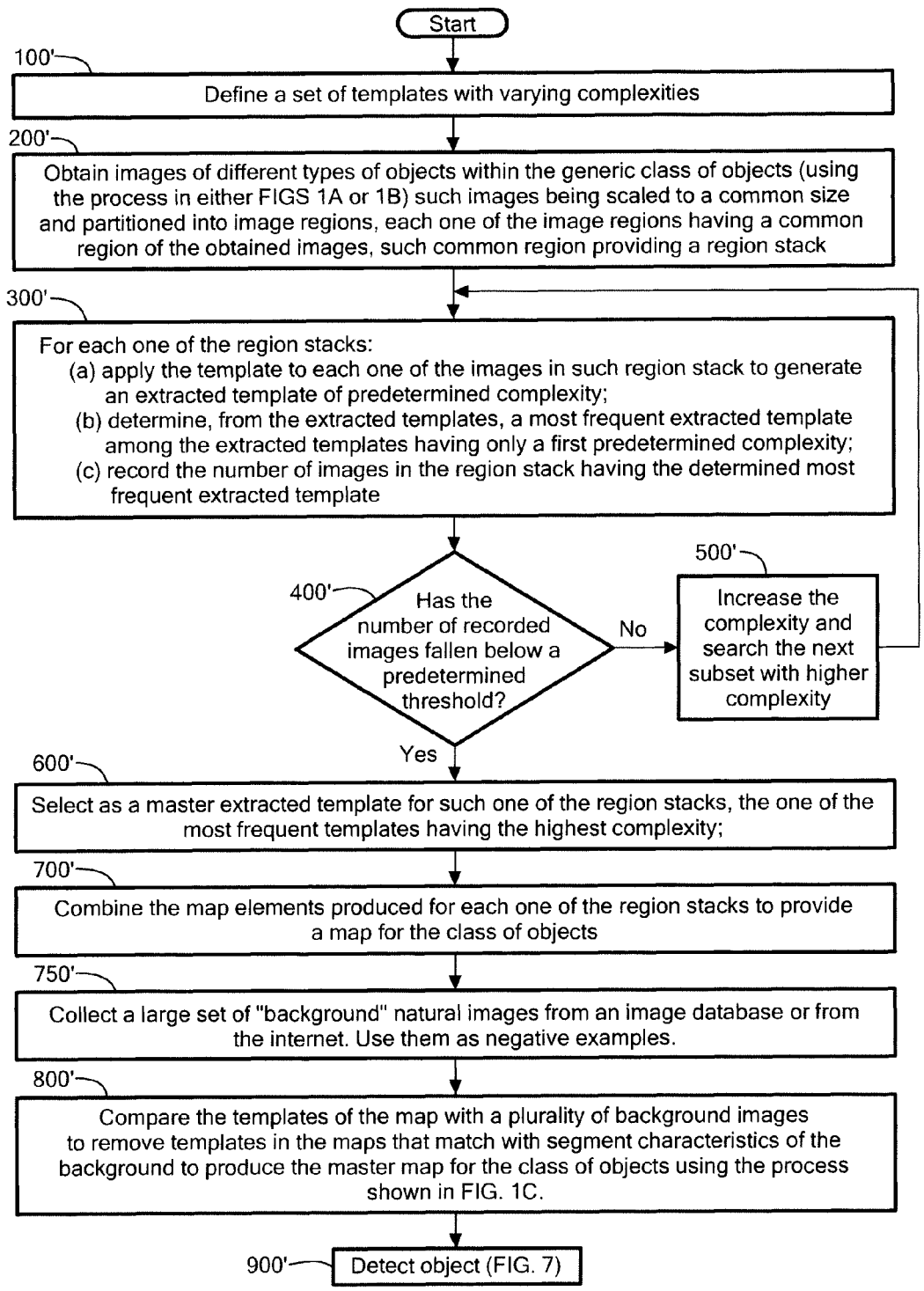
FIG. 1D is a flowchart of a process for detecting objects of diverse or different shapes belonging to a generic class of such objects within a cluttered, natural background according to the invention.

A number of embodiments of the invention have been described. Nevertheless, it will be understood that various modifications may be made without departing from the spirit and scope of the invention. For example, while LASSO has been used it should be understood that other feature selection methods might be used, for example boosting. Thus, referring to FIG. 1D, a flowchart is shown for the more general case where something other than edges are used, such as, for example, corners. Here, a prime (') designation is used for Steps 100-900 of FIG. 1A; thus the equivalent process steps are designated as Steps 100'-900', respectively in FIG. 1D. Further other varying complexity templates can be used. Accordingly, other embodiments are within the scope of the following claims.

Methods provided in accordance with one or more aspects of the present invention, were implemented in C++ and tested on a Windows PC with 2G CPU and 1G memory. It takes less than one second to detect cars in one image. Most computation has been spent on wavelet feature extraction. The following table provides a comparison of a measure of performance (Equal Error Rate) for the UIUC dataset which is available from the Internet at URL http://cogcomp.cs.illinois.edu/DatalCar/ against methods as disclosed in known literature.

| Model | Equal Error Rate (EER) |
| --- | --- |
| Agarwal et al. | 76.5 |
| Fergus et al. | 88.5 |
| FEAT | 89 |
| Shotton et al. | 92.8 |

-continued

| Model | Equal Error Rate (EER) |
|---|---|
| FEAT + Appearance | 94 |
| Leibe et al. | 91/97.5 |
| Mutch & Lowe | 99.4 |

What is claimed is:

1. A method for generating a master map for a generic class of objects, comprising:
 a processor generating a template pool containing a plurality of templates of linear edge fragments having a predetermined size and one of a predetermined plurality of different spatial orientation, wherein the template pool is generated from a region stack of images of the generic class of objects;
 the processor selecting a subset of frequent templates from the template pool having a plurality of templates having various degrees of complexity; and
 the processor applying a feature selection algorithm to determine a most discriminative template from a preselected one of the templates in the template pool; and
 the processor generating the master map from the formulated feature selection algorithm.

2. The method recited in claim 1 wherein the degree of complexity is controllable.

3. A method for generating a master map for a generic class of objects, comprising:
 (A) defining on a processor a template having segment regions, wherein at least one of such regions includes a linear edge fragment having a predetermined size and one of a predetermined plurality of different spatial orientation;
 (B) the processor obtaining images of different types of objects within the generic class of objects; such images being scaled to a common size and partitioned into image regions, each one of the image regions having a common region of the obtained images, such common region providing a region stack;
 (C) the processor for each one of the region stacks:
  (a) applying the template to each one of the images in such region stack to extract, from each one of the images, features having the predetermined size and one of the predetermined plurality of different spatial orientations, to generate, for each one of the images in the region stack, extracted templates;
  (b) determining, from the extracted templates, a most frequent extracted template among the extracted templates having only a first predetermined number of features with a common spatial orientation;
  (c) recording the number of images in the region stack having the determined most frequent extracted template;
  (d) repeating (b) and (c) with successively increasing predetermined number of features until the number of recorded images falls below a predetermined threshold;
  (e) selecting as a master extracted template for such one of the region stacks, the one of the most frequent templates having the largest recorded number of features;
 (D) the processor combining the master extracted templates for each one of the region stacks into a map for the class of objects; and
 (E) the processor comparing the map with each one of a plurality of background images to remove, from the map master extracted, extracted templates therein matching segment characteristics of the background to produce the master map for the class of objects.

4. A method for generating a master map for a generic class of objects, comprising:
 (A) processor partitioning images of different types of objects within a class into region stacks; and
 (B) the processor for each one of the stacks:
  (a) applying a template to extract a linear edge fragment having a predetermined size and one of a plurality of different spatial orientations, to generate extracted templates;
  (b) determining, from the extracted templates, a most frequent one thereof having only a first number of linear edge fragments with a common spatial orientation;
  (c) recording the number of images having the determined most frequent extracted template;
  d) repeating (b) and (c) with successively increasing number of linear edge fragments until the number of recoded images falls below a threshold; and
  (e) selecting as a master extracted template the one of the most frequent templates having the largest recorded number of linear edge fragments;
 (C) the processor combining the master extracted templates for the stacks into a map; and
 (E) the processor comparing the map with background images to remove an extracted templates matching segment in a background.

5. A method for generating a master map for a generic class of objects, comprising:
 (A) defining on a processor a template having segment regions, wherein at least one of such regions includes a linear edge fragment having a predetermined size and one of a predetermined plurality of different spatial orientation;
 (B) the processor obtaining images of different types of objects within the generic class of objects; such images being scaled to a common size and partitioned into image regions, each one of the image regions having a common region of the obtained images, such common region providing a region stack;
 (C) for each one of the region stacks:
  (a) applying the template to each one of the images in such region stack to extract, from each one of the images, a linear edge fragment having the predetermined size and one of the predetermined plurality of different spatial orientations, to generate, for each one of the images in the region stack, an extracted template;
  (b) determining, from the extracted templates, a most frequent extracted template among the extracted templates having only a first predetermined number of linear edge fragments with a common spatial orientations;
  (c) recording the number of images in the region stack having the determined most frequent extracted template;
  (d) repeating (b) and (c) with successively increasing predetermined number of features until the number of recoded images falls below a predetermined threshold;
  (e) selecting as a master extracted template for such one of the region stacks, the one of the most frequent templates having the largest recorded number of linear edge fragments;

(D) the processor combining the master extracted templates for each one of the region stacks into a map for the class of objects; and
(E) the processor comparing the map with each one of a plurality of background images to remove, from the map master extracted, extracted templates therein matching segment characteristics of the background to produce the master map for the class of objects.

* * * * *